Patented Mar. 9, 1943

2,313,680

UNITED STATES PATENT OFFICE 2,313,680

MANUFACTURE OF THIOCYANATES

Lee B. Smith, Woodbridge, N. J., assignor to General Chemical Company, New York, N. Y., a corporation of New York No Drawing. Application January 26, 1942,
Serial No. 428,222

10 Claims. (Cl. 23—75)

This invention is directed to processes for making alkali metal thiocyanates. While the principles of the improvements are applicable to manufacture of potassium thiocyanate, for convenience the invention is discussed largely in connection with production of sodium thiocyanate.

In the most commonly used commercial method for making sodium thiocyanate, a sodium cyanide solution is reacted with sulfur in aqueous suspension to form crude sodium thiocyanate liquor containing substantial quantities of sodium compound impurities mostly as sodium carbonate, sodium sulfide and sodium hydroxide. In the prior practice, such sodium thiocyanate solution is concentrated and solid sodium thiocyanate subsequently recovered in crystal form. On account of the high impurity content of the crude sodium thiocyanate solution, the sodium thiocyanate crystals obtained by crystallization are contaminated with substantial quantities of sodium carbonate and sodium sulfide. For example, first crop crystals manufactured by this procedure often contain 0.7–1.4% sodium carbonate and as high as 0.02% sodium sulfide. If more nearly pure sodium thiocyanate crystals are desired, it is necessary to resort to expensive and cumbersome recrystallization operations. Furthermore, in the prior art method the sodium carbonate, sulfide and hydroxide impurities build up in the mother liquor, from which sodium thiocyanate is crystallized, to such an extent that substantial quantities of mother liquor must be discarded from time to time in order to obtain a sodium thiocyanate product of reasonably suitable purity. It has not been feasible in the past to remove sodium compound impurities from crude sodium thiocyanate liquors, prior to sodium thiocyanate crystallization, by treating the crude liquor with reagents such as calcium nitrate and lead nitrate which precipitate carbonate and sulfide of the impurities as calcium carbonate and lead sulfide because the sodium nitrate simultaneously formed is very soluble and cannot be taken out of the liquor before crystallizing the sodium thiocyanate. Hence, the sodium nitrate remains in the sodium thiocyanate liquor and contaminates subsequently crystallized sodium thiocyanate to an extent comparable with the contamination brought about by the presence of sodium carbonate, sodium sulfide and sodium hydroxide in liquors from which sodium thiocyanate is crystallized.

The primary object of this invention is provision of methods for making alkali metal thiocyanates by procedure according to the practice of which it is possible to produce alkali metal thiocyanate crystals of greater purity than heretofore, and further to effect such production of high purity alkali metal thiocyanates without necessity of recrystallization, and without discard from the system of substantial quantities of mother liquor after separation of crystallized alkali metal thiocyanates. A further object of the invention is provision of methods by which the foregoing object may be attained and at the same time so-called off-grade alkali metal cyanides, containing relatively large amounts of alkali metal carbonate, sulfide, and hydroxide impurities, may be used as sources of alkali metal cyanide.

Since the sought-for alkali metal thiocyanate products are formed by crystallization out of a liquor, this mode of solid product formation necessarily causes contamination of the crystals with impurities if the mother liquor from which the alkali metal thiocyanate is crystallized contains substantial quantities of impurities. Hence, the problem presented is minimization of the impurity content of the alkali metal thiocyanate solution from which alkali metal thiocyanate crystals are formed. Such minimization in turn requires conversion of the alkali metal impurities in the crude alkali metal thiocyanate liquor to a form in which most of such impurities may be removed from the liquor before alkali metal thiocyanate crystallization is effected.

In accordance with this invention, it has been found that by treating a crude alkali metal thiocyanate solution—containing alkali metal compound impurities principally in the form of carbonate, sulfide and hydroxide—with sulfuric acid in a manner hereinafter described, it is possible to convert alkali metal compound impurities partly to the form of gases which may be expelled by heating and partly to alkali metal sulfate which may be removed from the alkali metal thiocyanate liquor, prior to crystallization of alkali metal thiocyanate, to such an extent that the alkali metal thiocyanate crystals subsequently crystallized out of the liquor are contaminated to only a very small degree with alkali metal sulfate.

Returning to description of the invention in connection with manufacture of sodium thiocyanate, anhydrous or the dihydrate, the sulfuric acid treatment and subsequent steps of the invention are applicable to treatment of crude sodium thiocyanate solutions made according to any known or convenient method. It will be understood the crude sodium thiocyanate solutions formed by reaction of sodium cyanide and sulfur contain, even if pure sodium cyanide were used, substantial quantities of sodium hydroxide and sodium sulfide, the sodium hydroxide being formed by hydrolysis of sodium cyanide, and the sodium sulfide by side reactions involving reaction of sulfur and sodium hydroxide. Since in practice the sodium cyanide employed is commercial sodium cyanide which contains substantial quantities of sodium carbonate, sodium hydroxide and sodium cyanate impurities, the resulting crude sodium thiocyanate liquor contains, in addition to the sodium hydroxide and sodium sulfide formed during the sodium cyanide-sulfur reaction, sodium carbonate and sodium hydroxide impurities brought in with the commercial sodium cyanide and also sodium carbonate formed by decomposition of sodium cyanate. Thus crude sodium thiocyanate solutions contain as the major impurities sodium carbonate, sodium sulfide and sodium hydroxide. While the sodium compound impurity content of the crude sodium thiocyanate liquor may obviously vary over a rather wide range because of differing operating conditions and varying sodium compound impurities contained in the initial sodium cyanide, it may be said that typical crude sodium thiocyanate solutions contain from 0.25 to 2.00% $Na_2CO_3$, from 0.02 to 0.25% $Na_2S$, and from nil to 0.25% NaOH.

In manufacture of sodium cyanide, it often happens that there are produced substantial quantities of sodium cyanide in which the sodium carbonate, sodium hydroxide and sodium cyanate content is too high to satisfy commercial specifications. The nature of the present improvements is such that this so-called off-grade sodium cyanide may be readily used as the source of NaCN in production of crude sodium thiocyanate solution.

While the known sodium cyanide-sulfur reaction is being carried out, temperatures are such as to decompose most of any sodium cyanate impurity present to sodium carbonate, and ammonia and $CO_2$ both of which pass off as gases. On completion of reaction, the mass is filtered to separate out excess sulfur. If the filtrate contains any polysulfide, indicated by yellow coloration, the filtrate is heated, if cool, to temperature of 85–105° C., and enough sodium cyanide is added to reduce polysulfide to the colorless monosulfide, $Na_2S$. To insure completion of decomposition of sodium cyanate, it is preferred to boil the filtrate after the reduction of polysulfide to monosulfide until there is no discernible trace of ammonia in the vapors over the liquor, this condition indicating completion of sodium cyanate decomposition. The liquor is then permitted to cool to about 85–75° C. in order to avoid too violent evolution of $CO_2$ during the subsequent treatment with sulfuric acid. Crude sodium thiocyanate solutions of the type described are strongly alkaline, the pH varying from about 10.5 to 9.5. The sodium compound impurity contents, principally sodium carbonate, sodium sulfide and sodium hydroxide, vary as previously indicated. Concentration of these crude solutions, at 20° C., may range from 23° Bé. to 28° Bé.

In accordance with the invention, the crude sodium thiocyanate solution is treated with sulfuric acid in quantity to convert all of the sodium compound impurities contained in the liquor to sodium sulfate, water, $CO_2$ and $H_2S$. This may be accomplished when the amount of sulfuric acid used is such as to lower the pH of the resulting acid treated liquor to 6.3, and preferably to 5 which I find to be the most satisfactory working figure. While pH lower than 4.2 may be used in some instances, greater acidity is not required, and for pH values below 4.2 there is an appreciable tendency to decompose sodium thiocyanate in some operations. In this sulfuric acid treatment step, sodium carbonate is converted to sodium sulfate and $CO_2$, sodium sulfide to sodium sulfate and $H_2S$, and sodium hydroxide to sodium sulfate and water. I find that by so proceeding, the sodium compound impurities present in the crude thiocyanate liquor may be converted partly to gases which are driven off as such and partly to soluble sodium sulfate which is an impurity having characteristics such that most of it may be removed from the sodium thiocyanate liquor prior to crystallization of the sought-for sodium thiocyanate products. Further, I am enabled to accomplish impurity removal from crude sodium thiocyanate solution without decomposing sodium thiocyanate.

In carrying out the acid treatment step, sulfuric acid of any strength may be employed. However, to facilitate addition of sulfuric acid to the crude sodium thiocyanate solution without control of rate of acid addition in order to avoid local decomposition of sodium thiocyanate, it is preferred to use sulfuric acid of strength not exceeding 40%. Following completion of addition of the sulfuric acid, any residual $CO_2$ and $H_2S$ in the liquor may be expelled by agitation or aeration preferably while the liquor is warm or hot. The liquor is then preferably treated with decolorizing carbon and filtered.

The next step in the process comprises separation of sodium sulfate from the sodium thiocyanate liquor. This is accomplished by evaporating the liquor to a concentration not in excess of that at which, on cooling of the evaporated liquor to a temperature close to but above the transition point of anhydrous sodium thiocyanate to the dihydrate, the thus cooled liquor is not saturated with respect to anhydrous sodium thiocyanate. Sodium sulfate crystallized during evaporation and cooling is then separated out of the liquor.

Appreciable decomposition of sodium thiocyanate begins to take place at temperatures of about 105° C. Hence, during evaporating and concentrating operations temperatures in excess of 105 C. should be avoided, and preferably evaporation and concentration are carried out under pressure sufficiently reduced so that liquor temperatures do not exceed about 95° C.

To bring about crystallization of sodium sulfate without crystallizing sodium thiocyanate, the clarified sodium thiocyanate-sodium sulfate filtrate is evaporated by heating to a concentration close to but not in excess of a concentration corresponding to 38° Bé. at 80° C. More particularly, the filtrate may be concentrated under reduced pressure of about 110 mm. of Hg to a boiling point of about 80° C. Liquor concentration at this stage corresponds to 38° Bé. at 80° C., and the liquor is saturated with respect to sodium sulfate, a large portion of the sodium sulfate having been already salted out during evaporation. The vacuum is broken and the concentrated liquor is cooled down close to but not below the transition point (about 30° C.) of anhydrous sodium thiocyanate to the dihydrate. By evaporating the liquor to a concentration corresponding to 38° Bé. at 80° C., concentration of the evaporated liquor with respect to sodium thiocyanate is such that when the liquor is cooled to a temperature, e. g. 35° C., providing a convenient working temperature above the transition point of sodium thiocyanate to the dihydrate, the liquor is not saturated with respect to sodium thiocyanate, and consequently no crystallization of sodium thiocyanate takes place. The solubility of sodium thiocyanate dihydrate is substantially less than that of anhydrous sodium thiocyanate and, if the temperature on cooling is permitted to drop below the transition point of sodium thiocyanate to the dihydrate, an appreciable quantity of sodium thiocyanate dihydrate is likely to crystallize out along with the sodium sulfate. Hence minimum temperature of cooling is kept above the indicated transition point.

Crystallized sodium sulfate, which at such temperatures is also in the anhydrous form, is filtered out of the sodium thiocyanate liquor at a temperature above the transition point of sodium thiocyanate to the dihydrate. Where the initial sodium thiocyanate-sodium sulfate liquor has been evaporated to the degree indicated, i. e., as high or almost as high as a concentration corresponding with 38° Bé. at 80°C., the concentration of the evaporated liquor, with respect to sodium sulfate, has been effected to an extent such that, after cooling and separation of sodium sulfate crystals, the sodium thiocyanate filtrate has a very low concentration of sodium sulfate, less than 0.25%. In order to separate sodium sulfate in such a way that the sodium thiocyanate filtrate, after separation of sodium sulfate crystals, does not contain more than about 0.3% sodium sulfate, it is preferred to evaporate the initial sodium thiocyanate-sodium sulfate liquor to a concentration not less than that corresponding to 36° Bé. at 80° C. Thus when evaporating the sodium thiocyanate-sodium sulfate liquor to a concentration not less than that corresponding to 36° Bé. at 80° C. and not in excess of a concentration corresponding to 38° Bé. at 80° C., it is possible on cooling to about say 35° C., to avoid crystallization of sodium thiocyanate and effect crystallization of sodium sulfate to such a degree that the mother liquor, after separation of the sodium sulfate crystals, contains not more than about 0.3% sodium sulfate.

Following separation of the sodium sulfate crystals, the sodium thiocyanate filtrate is then concentrated under any suitable conditions to form a substantially saturated solution of sodium thiocyanate at a temperature preferably below 95° C. For example, the sodium thiocyanate filtrate may be concentrated at reduced pressure of about 110 mm. of Hg to a boiling point of about 87° C., at which point the sodium thiocyanate solution is substantially saturated. The vacuum is then broken and the liquor is cooled. Minimum temperature of cooling is dependent upon whether it is desired to recover the product as anhydrous sodium thiocyanate or as sodium thiocyanate dihydrate. The preferred sodium product of the invention is anhydrous sodium thiocyanate, and consequently the liquor is cooled to a temperature close to but above the transition point of sodium thiocyanate to the dihydrate, and the resulting anhydrous sodium thiocyanate crystals are separated out of the mother liquor at a temperature above such transition point. The mother liquor may be returned preferably to the sodium thiocyanate evaporator, for reprocessing with a succeeding batch. The anhydrous sodium thiocyanate crystals are washed lightly with distilled water and preferably dried under a vacuum of from 550 mm. to 760 mm. of Hg at temperature ranging from 80 to 105° C. The product crystals obtained from the indicated preferred operating conditions analyze above 99% NaCNS, $Na_2SO_4$ content is not in excess of about 0.2%, and the $Na_2S$, $Na_2CO_3$ contents are substantially nil.

If sodium thiocyanate dihydrate is desired as the final product, the concentrated sodium thiocyanate liquor is cooled down to below the transition point of NaCNS to $NaCNS.2H_2O$, and the dihydrate crystals are filtered out.

In the manufacture of potassium thiocyanate, the procedure followed is substantially the same as that already described in connection with production of sodium thiocyanate up to and including clarification of sodium thiocyanate-sodium sulfate solution by treatment with decolorizing carbon and filtration. Separation of potassium sulfate from clarified potassium thiocyanate-potassium sulfate solution differs somewhat from separation of sodium sulfate from clarified sodium thiocyanate-sodium sulfate solution because of different solubilities of the potassium salts and because potassium thiocyanate dihydrate apparently does not exist.

What has been noted previously as to maximum evaporating and concentrating temperatures with respect to sodium thiocyanate likewise applies in production of potassium thiocyanate.

To separate potassium sulfate out of initial clarified potassium thiocyanate-potassium sulfate liquor, the liquor is evaporated to a concentration not in excess of that at which, on cooling to a suitable working temperature which may be from say 20 to 30° C., the cooled solution is not saturated with respect to potassium thiocyanate. Such concentration may be effected by evaporating the liquor to a concentration close to but not in excess of a concentration corresponding to 42° Bé. at 72° C. For example, the initial liquor may be concentrated under reduced pressure of about 110 mm. of Hg to a boiling point of about 72° C., this condition corresponding with a concentration of about 42° Bé. at 72° C. The vacuum is broken and the concentrated liquor is cooled. Since minimum temperature of cooling is not dependent upon prevention of crystallization of potassium thiocyanate dihydrate, minimum temperature of cooling is more or less one of operating convenience, and hence the liquor may be cooled to between say 20 and 30° C. Concentration of the potasssium thiocyanate-potassium sulfate liquor to concentration corresponding to 42° Bé. at 72° C. creates conditions such that on cooling the concentrated liquor to a temperature not lower than about 20° C., the cooled liquor is not saturated with respect to potassium thiocyanate and none of this material crystallizes. Potassium sulfate crystallizes during evaporating and cooling, and the resulting anhydrous potassium sulfate is filtered out while the cooled liquor is at about room temperature. By this procedure the potassium thiocyanate filtrate contains not more than about 0.25% $K_2SO_4$. When evaporating the initial potassium thiocyanate-potassium sulfate liquor, it is preferred to evaporate to at least a concentration corresponding to 40° Bé. at 72° C. By so doing, the liquor is concentrated sufficiently, with respect to potassium sulfate, so that after separation of potassium sulfate crystals the potassium thiocyanate mother liquor filtrate contains not more than about 0.3% K$_2$SO$_4$.

The potassium thiocyanate filtrate is then concentrated under conditions to form a substantially saturated solution of potassium thiocyanate at temperature less than about 95° C. For example, the potassium thiocyanate solution may be concentrated at reduced pressure of about 110 mm. of Hg to a boiling point of 85° C. The vacuum is then broken and the liquor is cooled. Here again, minimum temperature to which the concentrated liquor is cooled is one of operating convenience, and may be anywhere from say 20 to 30° C. Potassium thiocyanate crystals are filtered out, washed lightly with distilled water and preferably dried under a vacuum of from 550 mm. to 760 mm. of Hg at temperatures varying from 80 to 105° C. When proceeding in accordance with the indicated preferred operating conditions, the product crystals analyze about 99% KCNS, K$_2$SO$_4$ content is not in excess of about 0.2%, and the K$_2$S and K$_2$CO$_3$ contents are substantially nil.

Following are specific examples of practice of the invention.

Example 1

In this example, directed to the manufacture of anhydrous sodium thiocyanate, the sodium cyanide used is an off-grade material analyzing 93.7% NaCN, 3.31% Na$_2$CO$_3$, 1.03% NaOH and 0.75% NaCNO. This sodium cyanide is dissolved in water in quantity to form about a 30% NaCN solution, approximately a saturated sodium cyanide solution. 535 parts by weight of flowers of sulfur are mixed with sufficient water to form a 30% slurry, and the slurry is heated to boiling. Sodium cyanide solution is added to the sulfur slurry, the total amount of 100% NaCN being 773 parts by weight. Temperature of the mass during addition of the sodium cyanide solution is about boiling, i. e., 103-105° C. but may be 80° C. or lower. The crude sodium thiocyanate solution, after removal of excess elemental sulfur by filtration, is then boiled until the vapors contain no ammonia, indicating completion of decomposition of sodium cyanate to sodium carbonate and ammonia. After NH$_3$ expulsion the solution is cooled to about 80° C. in order to prevent too violent evolution of CO$_2$ when sulfuric acid is subsequently added. The pH of the crude sodium thiocyanate is about 10.5, and the solution contains sodium carbonate, sodium sulfide and sodium hydroxide as the major impurities.

Sulfuric acid of about 30% strength is added until the pH of the resulting acid treated liquor is reduced to 5. About 35 parts of 100% H$_2$SO$_4$ are needed. The sulfuric acid converts the sodium carbonate, sodium sulfide and sodium hydroxide impurities to sodium sulfate, water, CO$_2$ and H$_2$S. After completion of sulfuric acid addition the liquor is agitated and boiled until all H$_2$S and CO$_2$ have been expelled. The solution is then clarified by addition of decolorizing carbon followed by filtration. The concentration of the filtrate is about 25° Bé. at 20° C.

The clear sodium thiocyanate filtrate, containing sodium sulfate in solution, is concentrated under reduced pressure of about 110 mm. of mercury to a boiling point of about 80° C. corresponding to a concentration of 38° Bé. at 80° C. The vacuum is broken and the liquor is cooled down close to but not below the transition point (about 30° C.) of anhydrous sodium thiocyanate to sodium thiocyanate dihydrate. The concentration operation described is such that when the liquor is cooled down as indicated to a working value, e. g. 35° C., above such transition point, the liquor is not saturated with respect to anhydrous sodium thiocyanate and there is no crystallization of this material. At liquor temperature above about 30° C., the precipitated sodium sulfate is in the form of anhydrous Na$_2$SO$_4$ which is filtered out at temperature above the transition point of anhydrous sodium thiocyanate to the dihydrate. The anhydrous sodium sulfate is dried as completely as possible on the filter without washing, and the sodium sulfate amounts to about 60 parts by weight. The sodium thiocyanate filtrate resulting from separation of the anhydrous Na$_2$SO$_4$, containing not more than about 0.25% Na$_2$SO$_4$ in solution, is again concentrated at reduced pressure of about 110 mm. of mercury at a boiling point of about 87° C., corresponding to a concentration of about 42° Bé. at 87° C. At this point, the liquor is substantially saturated with sodium thiocyanate, the vacuum is broken and the liquor is cooled down close to but not below the transition point of anhydrous sodium thiocyanate to the dihydrate. The sodium thiocyanate crystals are filtered out at a temperature above such transition point so that anhydrous sodium thiocyanate product is recovered. The anhydrous crystals are washed lightly with a mist of distilled water and dried under a vacuum. The anhydrous sodium thiocyanate crystals analyze over 99% NaCNS, the Na$_2$SO$_4$ content is 0.2% or less. The crystals contain substantially no Na$_2$S or Na$_2$CO$_3$.

Example 2

In this example, directed to manufacture of anhydrous potassium thiocyanate, the potassium cyanide used is off-grade material analyzing 93.8% KCN, 3.1% K$_2$CO$_3$, 0.42% KOH, and 2.33% KCNO. This potassium cyanide is dissolved in water sufficient to form about a 35% KCN solution, approximately a saturated solution of KCN. 480 parts of flowers of sulfur are mixed with sufficient water to form a 30% slurry which is heated to boiling. Potassium cyanide solution is added, the total amount of 100% KCN used being 910 parts by weight. Temperature of the mass during addition of the cyanide solution is ordinarily about boiling, i. e., 103-105° C. but may be 80° C. or lower. The crude potassium thiocyanate solution, after removal of unreacted elemental sulfur, is boiled until the vapors contain no ammonia, this condition indicating completion of decomposition of potassium cyanate impurity to sodium carbonate and ammonia.

The potassium thiocyanate liquor at this point has a pH of around 9.5-10 and contains potassium carbonate, potassium sulfide, and potassium hydroxide as the major impurities. The liquor is then cooled down to about 80° C. to prevent too violent evolution of CO$_2$ during the subsequent treatment of the liquor with sulfuric acid.

The potassium compound impurities in the liquor are converted to sulfate by treating the liquor with sulfuric acid of about 30% strength in quantity to bring the pH of the acid treated liquor down to about 5. About 30 parts by weight of 100% H$_2$SO$_4$ are needed. The liquor mass is agitated and boiled until all H$_2$S and CO$_2$ have been expelled. The solution is clarified by treatment with decolorizing carbon and subsequent filtration.

The clear potassium thiocyanate filtrate, containing potassium sulfate in solution, is concentrated by evaporation at reduced pressure of about 110 mm. of mercury to a boiling point of about 72° C., corresponding to a concentration of about 42° Bé. at 72° C. The vacuum is broken, and the liquor is cooled down to about room temperature, e. g. 25–30° C. The concentration operation described is such that when the liquor is cooled down to the indicated convenient working temperature, 25–30° C., the liquor is not saturated with respect to anhydrous potassium thiocyanate, and there is no crystallization of this material. The anhydrous potassium sulfate crystals formed by concentration and cooling are filtered out and dried as completely as possible on the filter without washing. The moist sulfate amounts to about 65 parts by weight.

After removal of the potassium sulfate crystals, the filtrate containing not more than 0.25% $K_2SO_4$ is again concentrated under reduced pressure of about 110 mm. Hg to a boiling point of about 85° C., corresponding with a concentration of 50° Bé. at 85° C. The liquor is substantially saturated with potassium thiocyanate at this temperature. The vacuum is broken and the liquor is cooled to around room temperature, e. g. 25–30° C., and anhydrous potassium thiocyanate crystals are filtered out, washed lightly with a mist of distilled water and dried under vacuum. Anhydrous potassium thiocyanate crystals obtained analyzed about 99.5% KNCS, the $K_2SO_4$ content is not over 0.2% and the product contains substantially no $K_2S$ or $K_2CO_3$.

In the previous discussion and in the appended claims, the term "alkali metal" is intended to exclude ammonia.

I claim:

1. The process for making alkali metal thiocyanate which comprises treating an alkali metal thiocyanate solution, containing at least one impurity of the group consisting of alkali metal carbonate, alkali metal sulfide and alkali metal hydroxide, with sulfuric acid in quantity sufficient to convert substantially all alkali metal impurity contained in said solution to alkali metal sulfate, separating alkali metal sulfate from the resulting liquor while maintaining alkali metal thiocyanate in solution in said liquor, and then recovering alkali metal thiocyanate in solid form from said liquor.

2. The process for making alkali metal thiocyanate which comprises treating an alkali metal thiocyanate solution, containing at least one impurity of the group consisting of alkali metal carbonate, alkali metal sulfide and alkali metal hydroxide, with sulfuric acid in quantity sufficient to reduce the pH of the resulting liquor to not lower than 4.2 and not higher than 6.3 whereby alkali metal impurity contained in said solution is converted to alkali metal sulfate, separating alkali metal sulfate from said resulting liquor while maintaining alkali metal thiocyanate in solution in said liquor, and then recovering alkali metal thiocyanate in solid form from said liquor.

3. The process for making alkali metal thiocyanate which comprises treating an alkali metal thiocyanate solution, containing at least one impurity of the group consisting of alkali metal carbonate, alkali metal sulfide and alkali metal hydroxide, with sulfuric acid of strength not greater than 40% $H_2SO_4$ and in quantity sufficient to convert substantially all alkali metal impurity contained in said solution to alkali metal sulfate, separating alkali metal sulfate from the resulting liquor while maintaining alkali metal thiocyanate in solution in said liquor, and then recovering alkali metal thiocyanate in solid form from said liquor.

4. The process for making alkali metal thiocyanate which comprises treating an alkali metal thiocyanate solution, containing at least one impurity of the group consisting of alkali metal carbonate, alkali metal sulfide and alkali metal hydroxide, with sulfuric acid in quantity sufficient to convert substantially all alkali metal impurity contained in said solution to alkali metal sulfate, crystallizing alkali metal sulfate and separating such sulfate crystals from the resulting liquor while maintaining substantially all of the alkali metal thiocyanate in solution in said liquor, then crystallizing alkali metal thiocyanate from residual liquor, and separating alkali metal thiocyanate crystals therefrom.

5. In the process of purifying alkali metal thiocyanate solution containing at least one impurity of the group consisting of alkali metal carbonate, alkali metal sulfide and alkali metal hydroxide, the step comprising treating said solution with sulfuric acid in quantity sufficient to convert substantially all alkali metal impurity contained in said solution to alkali metal sulfate.

6. In the process of purifying alkali metal thiocyanate solution containing at least one impurity of the group consisting of alkali metal carbonate, alkali metal sulfide and alkali metal hydroxide, the step comprising treating the solution with sulfuric acid in quantity sufficient to convert substantially all alkali metal impurity contained in said solution to alkali metal sulfate but insufficient to reduce the pH of the resulting solution lower than 4.2.

7. In the process of purifying alkali metal thiocyanate solution containing at least one impurity of the group consisting of alkali metal carbonate, alkali metal sulfide and alkali metal hydroxide, the step comprising treating said solution with sulfuric acid of strength not greater than 40% $H_2SO_4$ and in quantity sufficient to convert substantially all alkali metal impurity contained in said solution to alkali metal sulfate.

8. The process for making sodium thiocyanate which comprises treating a sodium thiocyanate solution, containing at least one impurity of the group consisting of sodium carbonate, sodium sulfide and sodium hydroxide, with sulfuric acid in quantity sufficient to convert substantially all sodium compound impurity contained in said solution to sodium sulfate, concentrating the resulting liquor by heating to a concentration not less than that corresponding to 36° Be. at 80° C. and not in excess of a concentration corresponding to 38° Be. at 80° C., cooling the liquor to a temperature above the transition point of anhydrous sodium thiocyanate to the dihydrate, separating crystallized sodium sulfate from the liquor while maintaining the same at temperature above said transition point, concentrating the residual liquor by heating, cooling such liquor to crystallize sodium thiocyanate, and separating sodium thiocyanate crystals from such liquor.

9. The process for making anhydrous sodium thiocyanate which comprises treating a sodium thiocyanate solution, containing at least one impurity of the group consisting of sodium carbonate, sodium sulfide and sodium hydroxide, with sulfuric acid in quantity sufficient to convert substantially all sodium compound impurity contained in said solution to sodium sulfate, concentrating the resulting liquor by heating to a concentration not less than that corresponding to 36° Bé. at 80° C. and not in excess of a concentration corresponding to 38° Bé. at 80° C., cooling the liquor to a temperature above the transition point of anhydrous sodium thiocyanate to the dihydrate, separating crystallized sodium sulfate from the liquor while maintaining the same at temperature above said transition point, concentrating the residual liquor by heating, cooling such liquor to a temperature above the transition point of anhydrous sodium thiocyanate to the dihydrate, and separating anhydrous sodium thiocyanate from such liquor at a temperature above said transition point.

10. The process for making anhydrous potassium thiocyanate which comprises treating a potassium thiocyanate solution, containing at least one impurity of the group consisting of potassium carbonate, potassium sulfide and potassium hydroxide, with sulfuric acid in quantity sufficient to convert substantially all potassium compound impurity contained in said solution to potassium sulfate, concentrating the resulting liquor by heating to a concentration not less than that corresponding to 40° Bé. at 72° C. and not in excess of a concentration corresponding to 42° Bé. at 72° C., cooling the liquor to effect crystallization of potassium sulfate, separating potassium sulfate from the liquor, concentrating the residual liquor by heating, cooling such liquor to effect crystallization of anhydrous potassium thiocyanate, and separating anhydrous potassium thiocyanate from such liquor.

LEE B. SMITH.